Figure 1:
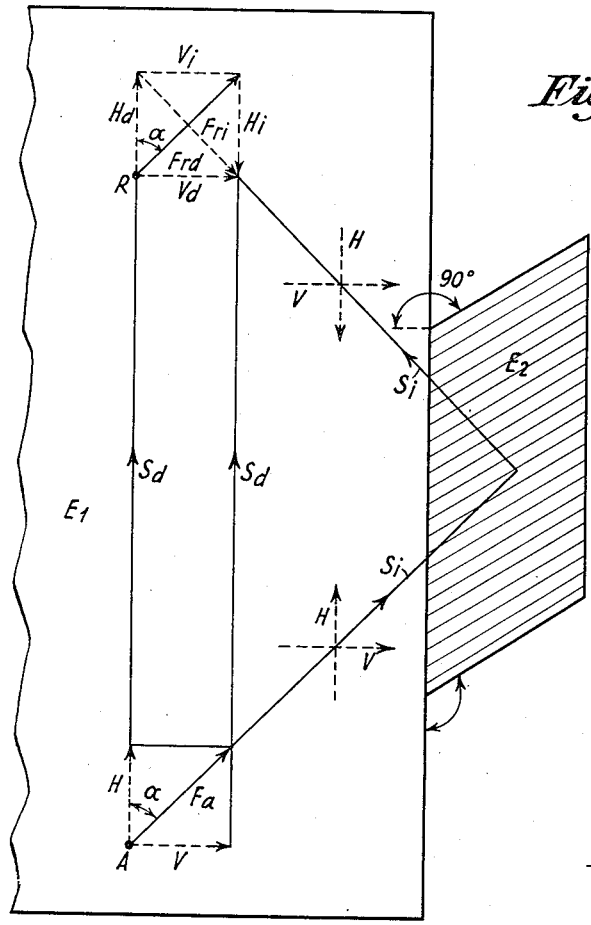

April 4, 1939.  H. SCHARLAU  2,153,209

METHOD OF AND MEANS FOR REDUCING DISTURBANCES

Filed Dec. 23, 1935

INVENTOR.
HANS SCHARLAU

BY

ATTORNEY.

Patented Apr. 4, 1939

2,153,209

UNITED STATES PATENT OFFICE 2,153,209

METHOD OF AND MEANS FOR REDUCING DISTURBANCES

Hans Scharlau, Berlin, Germany, assignor to Telefunken Gesellschaft für Drahtlose Telegraphie m. b. H., Berlin, Germany, a corporation of Germany Application December 23, 1935, Serial No. 55,698
In Germany December 22, 1934

3 Claims. (Cl. 250—11)

(Granted under the provisions of sec. 14, act of March 2, 1927; 357 O. G. 5)

The present invention relates to a method of reducing or eliminating disturbances occurring in the wireless transmission of intelligence or signals due mainly to the reflection of the radiation from conductive surfaces which are located in the radiation field, particularly in the space between transmitter and receiver.

In order to avoid fading, it is known to radiate circularly polarized waves and to construct the receiver in such a way that it is able to receive radiations of any polarization. According to the present invention, antennae are employed at the transmitters and receivers which are suitable for radiating or receiving, respectively, radiations polarized in a definite plane.

As is known, the high frequency radiation from a transmitting antenna may reach the receiving station not only by way of the direct path but also by way of reflection from a conductive surface. Moreover, interferences are caused at the receiving station by the phase difference between the direct and the reflected waves, which are peculiarly troublesome if the reflecting surface is moving, or there are variable path differences between direct and indirect radiation causing amplitude variations of the field strength at the receiving place.

According to the present invention, these disturbances are eliminated, or at least reduced to a tolerable amount, by arranging the transmitting antenna at an angle to the reflecting surface, so that there results a field component perpendicular to the reflecting surface and another field component parallel with the surface. Inasmuch as after the reflection of an inclined polarized radiation on a conductive surface the component of the reflected field, which is parallel with the reflecting surface, is in phase coincidence with the corresponding component of the incoming field, whereas the component of the reflected field, which is perpendicular to said surface, is in phase opposition to the corresponding component of the incoming field, there will result a rotation of the reflected field. If the receiving antenna is arranged perpendicular to the polarizing plane of the resulting reflected field, the antenna is not excited by the reflected field. On the other hand, the direct radiation in such case will be received. Therefore troublesome interference phenomena by the interaction of direct and indirect radiation cannot result.

Usually the ground, surface of water, or surfaces perpendicular thereto, e. g. the walls of a ship, act as reflecting surfaces. For this reason one arranges the antennas inclined by 45° against the ground and preferably in planes, which are perpendicular to the interconnection between transmitter and receiver. In this case all the transmitting and receiving antennas are arranged in parallel planes. The field of the transmitting antenna then may be split up into a vertical and a horizontal component of equal size. If reflected on a well conductive earth's surface, the vertical component of the field retains its phase. The horizontal component changes its phase by 180°. The reflected field is in quadrature to the field of the transmitting antenna. As the receiving antenna is parallel with the transmitting antenna, it is not excited by the reflected field. With regard to the direct radiation, however, the receiving antenna has the most favorable position.

The same points of view are valid of course, if the reflecting surface is perpendicular to the earth's surface. Suppose the transmitting antenna or else the reflecting surface is inclined at any angle with respect to the earth's surface, the amplitude of the horizontal component of the radiated field or the field falling upon the reflecting surface respectively is not equal to the amplitude of the vertical component. Nevertheless the polarization of the field rotates at the reflection, but not by 90°. A position of the receiving antenna always is to be found, where it is not excited by the reflected field; the receiving antenna and the transmitting antenna then are arranged in parallel planes. Always the tilted transmitting and receiving antennas lie in the same quadrant.

Figure 2:
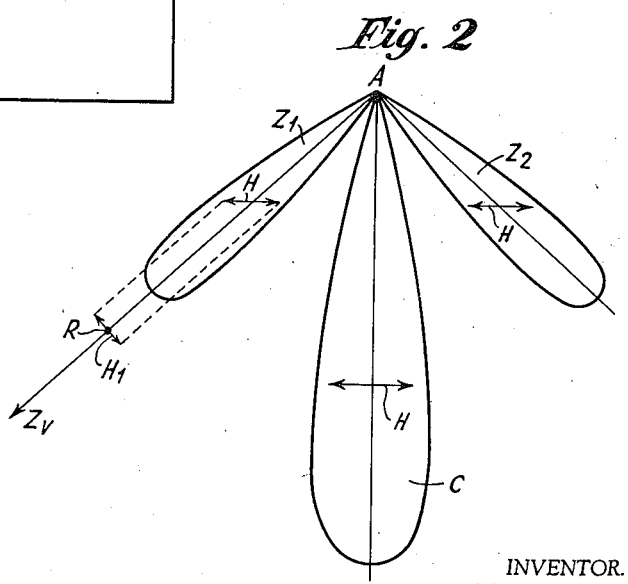

A better understanding may be had by referring to the accompanying drawing wherein Figs. 1 and 2 are given to illustrate the principles of the invention.

In Fig. 1 it has been tried to explain this process for a simplified example by a drawing. A plane $E_1$ is in quadrature to a second plane $E_2$. In the plane $E_1$ there are a transmitting antenna A and a receiving antenna R. The resultant field vector $F_a$ of the transmitting antenna A makes an angle $\alpha = 45°$ with the plane $E_1$. The resultant field vector $F_r$ of the receiver R makes the same angle $\alpha = 45°$ with the plane $E_1$. Both vectors or their corresponding antennas respectively lie in parallel planes. From transmitter A to the receiver R may run a direct radiation $S_d$ and a radiation $S_i$, which is reflected on the plane $E_2$. The direct radiation is desired, while the reflected radiation is to be made ineffective in this example. To make this process perceptible the resultant transmitting field vector $F_a$ is split up into a vertical component V and a horizontal component H (vertical and horizontal are to be considered with respect to the reflecting surface). As regards the direct radiation, neither component changes its sign on the way to the receiver. There are other conditions on the way via the reflecting plane $E_2$. The vertical component V is reflected on the plane $E_2$ without any phase change. With regard to the horizontal component a shift in phase by 180° occurs. Both antennas are inclined with respect to the reflecting surface $E_2$ by 45°. Vertical and horizontal component, therefore, are equal in size. The resultant $F_{ri}$ of the reflected (indirect) radiation is in quadrature to the resultant $F_{rd}$ of the direct incoming radiation; the resultant reflected field vector $F_{ri}$ (more exactly: the resultant vector of the reflected field) cannot excite the receiving antenna.

The invention shall be explained below by some examples, but no limitation to them is intended.

In practice the transmitting antenna is so arranged as to emit a radiation, which is inclined against the earth's surface by 45°, and is arranged in a plane, which is approximately perpendicular to the interconnection between the transmitter and the receiver.

The receiver preferably is made rotatable or is pivotally secured, in order to become so adjusted, that it may receive the direct radiation only. As the angular motion caused by reflection depends upon many influences, it is impossible to specify the direction of a receiving antenna. If there are reflecting surfaces substantially perpendicular to the earth's surface, it may be of advantage to arrange the receiving antenna horizontal, so that it is able to receive only the non-rotated, horizontally polarized direct radiation. The amount of received energy is then still 70% of the maximum radiation which may be received.

It should be emphasized, that reflection on one or more surfaces may still occur, as not the reflection itself, but only the effect of the reflected radiation on the receiver is to be reduced or eliminated.

As measurements have shown, lateral radiations, which occur at sharply concentrated beams, seem to be smaller regarding their effect on a receiving arrangement, which is polarized in the same sense. This experimentally proved fact may be explained by referring to Fig. 2 as follows.

In Fig. 2 A denotes a transmitter, which emits the main radiation C and two lateral radiations $Z_1$ and $Z_2$. The lateral radiations $Z_1$, $Z_2$ are polarized in the same direction as the main radiation C. If in the arrangement a receiving antenna R is used, which is polarized perpendicularly to the main vector $Z_v$ of a lateral radiation, the horizontal components H appear as projections H' on planes perpendicular to the direction of lateral radiation. This phenomenon may be made use of for various purposes. One may choose the polarization of the whole radiator in such a way, that the projection of the component of the lateral radiation on a certain receiving plane is equal to zero and the lateral radiation, therefore, cannot excite the antenna concerned.

The invention is not limited to short waves, but is of universal usefulness so long as definitely polarized waves are transmitted.

What I claim as new and desire to secure by Letters Patent of the United States is:

1. In combination, a transmitting antenna, a receiving antenna adapted to receive signal waves from said transmitting antenna, a conductive reflecting surface in the radiation field of said transmitting antenna, both said transmitting and receiving antennas being substantially parallel to each other and said transmitting antenna being tilted at an angle of 45 degrees with said surface whereby the reflected waves are polarized in a different direction from the directly transmitted wave and said receiving antenna being also tilted at an angle of 45 degrees with said surface, whereby substantially maximum reception of the direct radiation is obtained at said receiving antenna and minimum reception of reflected radiation.

2. The method of reducing or eliminating disturbances at a receiving antenna in the reception of message waves transmitted from a transmitting antenna due to undesired reflections from objects situated in the radiation field, which comprises transmitting definitely polarized waves from said transmitting antenna, arranging said transmitting and receiving antennas parallel to each other whereby the voltage pickup of the directly transmitted wave is a maximum and disposing said antennas at such an angle to the reflecting surfaces of said objects that the waves reflected from said surfaces and arriving at said receiving antenna are polarized in a different direction than the directly transmitted waves and so that the voltage pickup of said reflected wave is a minimum.

3. A transmitting antenna emitting waves polarized at an angle to the vertical, a receiving antenna and a reflecting surface, said transmitting and receiving antennas being arranged parallel to each other whereby the voltage pickup of the direct wave is a maximum and said antennas being arranged at such an angle with respect to the reflecting surface that the waves reflected from said reflecting surface and arriving at said receiving antenna are polarized in a different direction than the directly transmitted waves and so that the voltage pickup of said reflected wave is a minimum.

HANS SCHARLAU.